May 25, 1954

D. L. McKAY 2,679,539

SEPARATION OF EUTECTIC-FORMING MIXTURES BY CRYSTALLIZATION

Filed Dec. 22, 1949

INVENTOR.
D. L. McKAY
BY Hudson & Young
ATTORNEYS

Patented May 25, 1954

2,679,539

UNITED STATES PATENT OFFICE 2,679,539

SEPARATION OF EUTECTIC-FORMING MIXTURES BY CRYSTALLIZATION

Dwight L. McKay, Bartlesville, Okla., assignor to Phillips Petroleum Company, a corporation of Delaware Application December 22, 1949, Serial No. 134,390

4 Claims. (Cl. 260—674)

This invention relates to a continuous process and apparatus for separating binary mixtures, the components of which are completely miscible in the liquid state and completely immiscible in the solid state. In one aspect, it relates to a process and apparatus for separating binary eutectic-forming mixtures of organic compounds.

In separating binary mixtures by crystallization, when each of the components becomes completely saturated with respect to the other, further abstraction of heat will crystallize both components as a heterogeneous mass and in a definite ratio of concentrations. This is commonly referred to as a eutectic mixture. In a eutectic mixture, the components are completely miscible when in the liquid state and completely immiscible when in the solid state. In contrast, in a solid solution-forming mixture, the components are at least partially miscible with each other in the solid state.

If one of the components of a eutectic-forming mixture is present in excess of the concentration defined by the eutectic composition, that component is the saturating component and the other is the saturated component. When a eutectic-forming liquid mixture in which one of the components is present in excess of that defined by the eutectic composition is cooled, the mixture becomes saturated first with the saturating component and the amount of the saturating component in excess of that defined by the eutectic composition can be crystallized and removed to leave a mixture having the eutectic composition. No further separation is possible by ordinary crystallization methods. The prior art discloses processes for separating a few specific mixtures by the addition of a third component to a binary eutectic mixture to produce a ternary mixture in which one of the original two components is present in excess of the ternary eutectic composition.

In referring to mixtures having the eutectic composition, it is to be understood that mixtures of near-eutectic composition are included. As a practical matter, it is hardly likely that a mixture of the exact eutectic composition would ever be obtained in a large scale crystallization operation. However, for my purpose, when as much as practical of the saturating component has been crystallized without danger of crystallization of any eutectic mixture, the remaining mixture is referred to as having the eutectic composition.

The temperature at which a solid phase having the eutectic composition crystallizes is a definite and fixed temperature at a given pressure, and this temperature is called the eutectic temperature.

I have invented a process and apparatus for effecting the continuous separation of binary eutectic mixtures into their components. According to my process, when the excess of a saturating component has been crystallized and removed leaving a liquid mixture having a eutectic composition, I contact the eutectic liquid with a solid adsorbent material which preferentially adsorbs one of the components. This operation leaves a residual liquid rich in the other component, and the other component then is the saturating component. From this residual liquid some of the other component may be recovered by crystallization. The adsorbed material recovered from the adsorbent is termed desorbate, and in this case the desorbate recovered from the adsorbent is rich in that component which is preferentially adsorbed, and this component then becomes the saturating component in the desorbate and it may be separated by crystallization.

By using my process and apparatus, which will hereinafter be described, I am able to introduce a feed of eutectic-forming material continuously into the apparatus and remove from opposite ends the components in substantially pure form. My invention will be more clearly understood upon reading the following detailed description, drawing, and claims.

In the drawing, Figure 1 is a schematic diagram of my apparatus showing the different zones and points of addition and withdrawal for making separations according to my new process.

Figure 1:
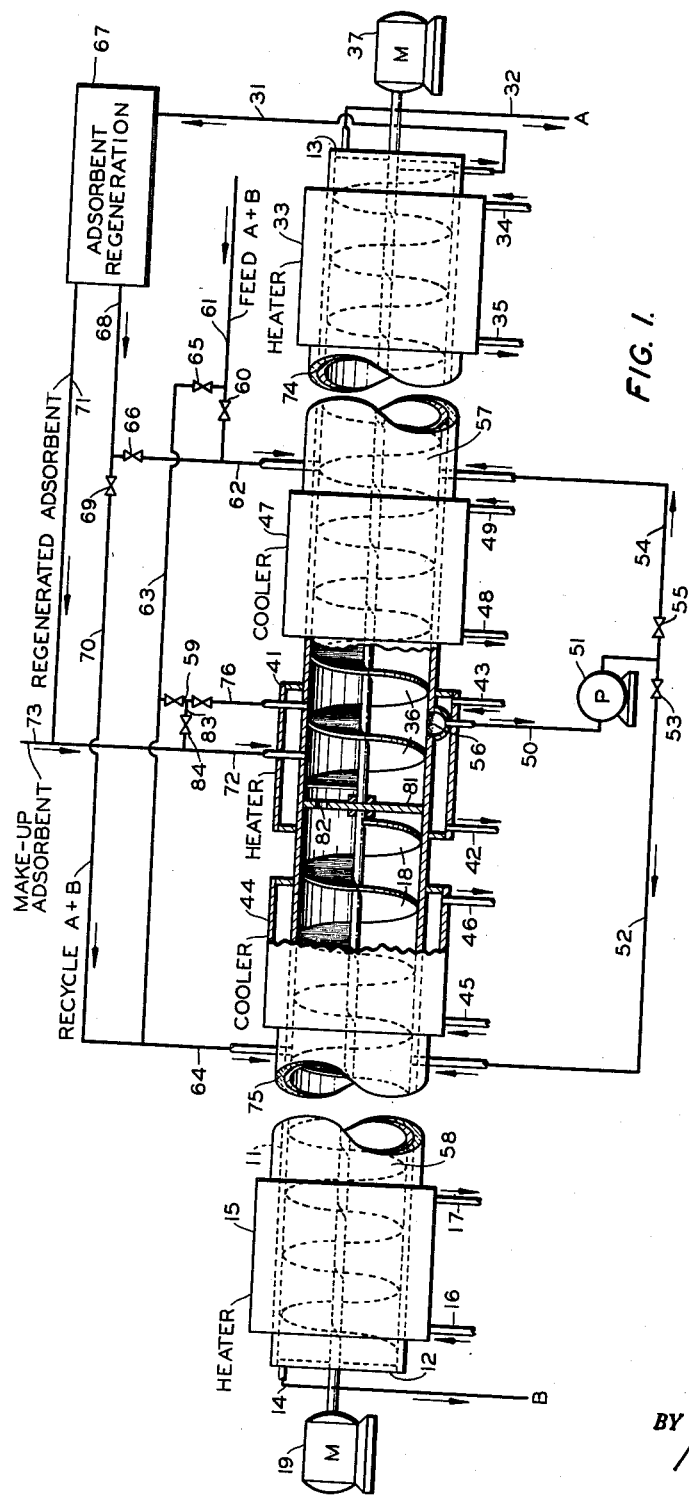
Figure 4:
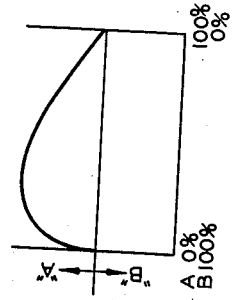
Figure 4 is illustrative of the type of adsorption isotherm where one component is selectively adsorbed throughout the entire concentration range.

In Figure 1 of the drawing, the apparatus consists of an elongated cylindrical tube 11 which is horizontally disposed. The ends of this tube are closed except for openings for attachment of a pipe 14 at one end, and of pipe 32 and conduit 31 at the other end. Disposed in this tube 11 is a conveyor 13 which I have shown diagrammatically as a screw conveyor. The shaft of this screw conveyor 18 also extends through the end wall 12 of the tube. This conveyor is rotated by the source of power 19. In the opposite end of the tube 11 is a conveyor 36, also illustrated as a screw conveyor. The shaft of this conveyor extends through the end wall 13 to a source of power 37. Pipes 62, 64, 50, 52, 54, and 76 are connected to the tube 11 in the generally central portion of the tube 11 as illustrated in the figure. The inner end of the screw conveyor 18 does not quite reach the midpoint of the tube, while the inner end of the conveyor 36 extends a short distance to the left of the midpoint of the tube. Surrounding the mid-section of the tube 11 is a heater element 41 while a heater 15 is disposed at a point near the left end of the tube and a heater 33 at a point near the right hand end of the tube. Sufficient distance should be left between the ends of the heating elements 15 and 33 and the respective tube ends so that end plates 12 and 13 may be bolted or otherwise attached to the ends of the tube. Also, sufficient space should be allowed for making pipe connections in case such are desired at these points. Some pipes 16 and 17 are for inlet and outlet of a heating agent to heater 15. Pipes 34 and 35 are for inlet and outlet of the heating agent to heater 33. Pipes 42 and 43 are likewise for inlet and outlet of a heating agent to heater 41.

Between heaters 41 and 15, but relatively close to heater 41, is disposed a cooler 44. The cooler 44 may, if desired, actually touch the heater 41, but it is preferable to have these heat exchange elements sufficiently separated that heat will not exchange between them. Pipes 45 and 46 are for inlet and outlet of a cooling agent for cooler 44. A cooler 47 is disposed between heating element 41 and heater 33, but relatively closer to heater 41. This cooler 47 should likewise preferably be spaced a short distance from the heater 41. Pipes 48 and 49 are for inlet and outlet of a cooling agent for cooler 47.

Pipe 50 is connected to the tube 11 at a point near the inner ends of the conveyor screw 36. A screen 56 or other means is provided over the inner end of pipe 50 to prevent withdrawal of solid material from the tube 11. A pump 51 is provided in pipe 50 for transfer of liquid. The outer end of pipe 50 is manifolded to pipes 52 and 54 as shown. Pipes 52 and 54 are provided with valves 53 and 55, respectively. An opening 82 in separator plate 81 makes provision that liquid flowing from the region of the cooler 44 to the heater 41 is introduced into this latter zone at a point near the point of addition of a solid adsorbent material. Pipes 62 and 64 are attached to the tube 11 in about the positions illustrated in the drawing. Pipe 64 is connected to a pipe 63 and a pipe 70 which pipes carry valves 65 and 69, respectively. Beyond valve 69, pipe 70 connects to pipes 62 and 68, the former of which is provided with a valve 66. A pipe 61 carrying a valve 60 is attached to pipe 62 and upstream of the valve 60, pipe 61 is attached to pipe 63 which, as mentioned above, is provided with valve 65. Unit 67 is an adsorbent regenerator unit. It may be termed a desorption unit. From unit 67 a conduit 71 leads to the conduit 72. To these two conduits is connected a conduit 73. Since the desorption unit 67 will treat a solid adsorbent material, the conduits 31, 71, 72, and 73 will need to be of a type to transfer solid adsorbent material. For example, these conduits may be screw conveyors, piston type conveyors, or even bucket conveyors, or any other type of conveyor adapted to the transfer of solid adsorbent material under conditions of operation to be described herein.

The heaters 15, 33, and 41 may be of any type of heater desired, while the coolers 44 and 47 may likewise be any type of cooler desired, provided, of course, such are adaptable for the heating and cooling problems of my invention.

The section of the tube 11 between the cooler 44 and the heater 15 should preferably be insulated with some type of efficient insulating material. The section of the tube 11 between the cooler 47 and the heater 33 should also be provided with insulation 74. These two sections of tube 11 should be insulated since it is desired that heat in these sections should not be lost to, or received from, the atmosphere.

Figure 2:
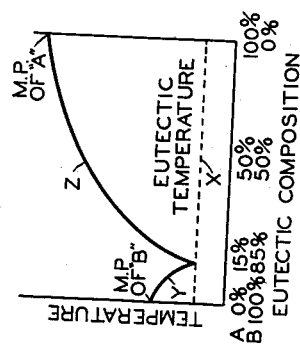
Figure 2 is a solid-liquid phase diagram for a two-component system.

Figure 2 is a diagrammatic representation of a solid-liquid phase diagram for a two-component pur-eutectic-forming system. For illustrative purposes, I will term the components "A" and "B." The point at which the lefthand curve of Figure 2 touches the lefthand ordinate represents the melting point of the component B, while the point at which the righthand curve touches the righthand ordinate represents the melting point of the component A. The lefthand curve of this figure is a curve showing the depression of the melting point of component B as caused by the presence of component A. When component B becomes saturated with component A, the melting point is represented by the lowest point of this curve. In like manner, the righthand curve is actually a melting point curve of component A containing various concentrations of component B, and the lower end of this curve, which is coincident with the lower end of the other curve, represents the melting point of A when it is saturated with component B. The lower end of these two curves is actually the temperature representing the melting point of A saturated with B, and B saturated with A, which temperature is the eutectic temperature. The concentration of the system under these conditions is the eutectic concentration or composition. Under a given pressure condition, the eutectic point of such a system represents a non-variant point, and the temperature and concentration are fixed.

A broken line X is drawn through the eutectic point horizontally until it intersects the ordinates representing 100 per cent B and 100 per cent A. The melting point curve of component B is identified by reference letter Y and the melting point curve of component A is represented by reference letter Z. The area above the curves Y and Z represent liquid conditions. The area under the curve Z and above the line X represents a two-phase region in which solid component A is in equilibrium with solution. The area under the curve Y also represents a two-phase region in which solid component B is in equilibrium with liquid. At all temperatures below the line X, the entire system is a solid and this solid may be all eutectic or part component A and eutectic, or it may be part component B and eutectic.

In the apparatus illustrated in Figure 1, a binary system consisting of components A and B, the phase diagram of which is illustrated in Figure 2, is separated into these components.

Assuming for purposes of illustration that the feed stock is a mixture of 50 per cent A and 50 per cent B, this feed stock in a liquid state is introduced into the system through line 51 from a source, not shown. The feed passes through valve 60 and line 62 into the tube crystallizer 11. The liquid upon entering the tube at first flows in both directions from its point of inlet. The liquid which flows toward the left in the tube reaches the region of the cooler 47 and since this charge stock contains component A in greater concentration than that contained in the eutectic mixture of the system, component A is the saturating component. Thus, in the cooler 47 some of component A will crystallize and drop out as a solid phase. This cooler 47 is operated at such a temperature that the contents of the tube, which is surrounded by the cooler, will be cooled to a temperature nearly as low as the eutectic temperature indicated in the diagram of Figure 2. Under these conditions a substantial quantity of component A will be frozen out from the solution. The conveyor 36 is operated in such a manner that solid material is moved from a midpoint longitudinally of the tube 11 toward the end 13. The solid component A frozen out in cooler 47 will then be moved from left to right by the conveyor 36. This solid material continues to move toward the right until it reaches the region of the heater 33. This heater is intended to be operated at a temperature above the melting point of component A so that the solid phase of component A will be melted. The liquid contents of the tube 11 to the right of the heater 33 is intended to be pure liquid component A, and this material A is removed as product through the line 32 in the liquid state.

As mentioned above, the degree of cooling carried out in cooler 47 is intended to freeze out all or substantially all of component A in excess of that contained in the eutectic composition from the feed stock. As indicated by the phase diagram of Figure 2, component A can be frozen out in cooler 47 leaving as a liquid residue some charge stock having a composition defined by the eutectic point of the diagram of Figure 2. For illustrative purposes, this eutectic composition is taken to be 15 percent component A and 85 per cent component B. As far as freezing or further cooling is concerned, this residual feed stock of the eutectic composition cannot be separated into its component parts. In order to effect a separation of these components from the eutectic mixture, I provide pipe 72 through which a solid adsorbent material is introduced into the tube 11. This adsorbent material is so selected that it will preferentially adsorb component A to a greater extent than it will adsorb component B under conditions existing in the central portion of the tube 11. By the term "preferential adsorption of component A," the meaning intended to be conveyed is that if the eutectic composition is 15 per cent A and 85 per cent B, the adsorbent must be capable of adsorbing A and B in a ratio greater than the eutectic ratio 15/85. When an adsorbent adsorbs more than 15 per cent A and less than 85 per cent B, the abovementioned condition is met and the unadsorbed residue is depleted in component A and accordingly is enriched in component B. This solution then contains B as the saturating component and some B may be recovered by crystallization. In other words, the adsorbent should adsorb preferentially component A from the liquid mixture of eutectic composition at the eutectic temperature or at a temperature slightly higher than the eutectic temperature. This solid adsorbent with its charge of adsorbed component A with some component B then is moved by the conveyor 36 in the direction of the heater 33. By the time the solid adsorbent with its charge of adsorbed A and occluded B reaches the region of the cooler 47, it is joined by the crystallized component A which froze out in the chiller 47. This mixture of solids then is slowly moved by conveyor 36 from the region of cooler 47 toward the heater 33. Since solid material which, of course, will occupy the lower portion of the tube 36, is transferred from left to right, it will be displaced by liquid moving from right to left in the tube. Since the solid material in the tube during transfer is continuously agitated, liquid flowing from right to left will, of course, contact this solid material and a general refluxing operation occurs. In the region of the heater 33, liquid A is present in a relatively pure condition and some of this liquid is the liquid which flows from the right toward the left in the tube 11. This liquid A tends to wash the occluded B from the adsorbent and from the crystalline A so that as the solid material approaches the region of the heater 33, the concentration of component A in a given cross section of the tube 11 has markedly increased and the concentration of the component B has decreased correspondingly.

Figure 3:
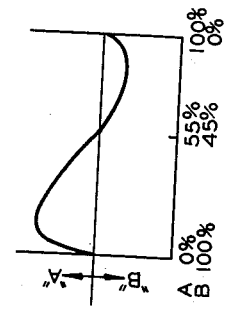
Figure 3 is a curve representative of the type of adsorption isotherm obtained where one component is selectively adsorbed over part of the concentration range and another component is selectively adsorbed over the remainder of the concentration range.

In addition to selecting an adsorbent which will adsorb component A preferentially over component B under eutectic conditions, the adsorbent is also selected from among those which exhibit an S-type adsorption curve as illustrated in Figure 3. From this S-type curve of Figure 3 when the concentration of component A is higher than about 55 per cent, the adsorbent releases previously adsorbed component A which it acquired in the region of the heater 41 and selectively adsorbs component B. In other words, by the time the adsorbent reaches the heater 33, all or substantially all of component B which was not refluxed by molten A flowing from right to left will be tightly retained in an adsorbed condition by the adsorbent. This adsorbent with its charge of adsorbed B is then moved beyond the heater 33 by the conveyor 36 to such a point that the rich adsorbent is removed from the end of the tube through a conveyor 31 and passed to the regeneration unit 67. Substantially pure liquid component A is removed from the tube through the line 32 to such disposal as desired.

The changes occurring within the contents of the tube in the insulated sections 57 are adiabatic since this section is well protected against loss or gain of heat from the atmosphere by the insulation 74. Due to the general refluxing operation taking place in this section 57, there is a progressive increase in the concentration of component A and in temperature from left to right.

After the solid adsorbent material has adsorbed some component A from the eutectic liquid in the region of the heater 41, the composition of the remaining liquid is altered and it is no longer a eutectic mixture. This liquid is then richer in component B, and component B becomes the saturating component. This component can be frozen from the solution at a temperature above the eutectic temperature. In other words, when the solid adsorbent in the region of heater 41 adsorbes some of component A from the eutectic liquid, the freezing point of the remaining liquid is raised, and it is for this reason that the heater 41 is provided. The heater 41 must be operated at a sufficiently high temperature that as the adsorbent removes component A from the eutectic liquid some component B will not freeze out simultaneously. Since the reamining liquid in the region of the heater 41 contains component B as the saturating component, this liquid is then withdrawn from the tube 11 through the pipe 50 and is transferred under the influence of the pump 51 through pipe 52 and valve 53 to a point in the adiabatic section 58 of the tube 11 near the cooler 44. This section 58 is an adiabatic section similar to section 57 at the other end of the tube. Section 58 is insulated by insulation 75 against transfer of heat to or from the atmosphere. The liquid entering section 58 through pipe 52 flows into the cooler 44 and this cooler is operated at such a temperature that some component B will crystallize out as a solid. This temperature is also maintained at a value at least slightly above the eutectic temperature so that solid eutectic will not form at this point. When solid B separates from the solution in cooler 44, the conveyor 18 operates to move the solid component B from the region of the cooler 44 toward the heater 15. Solid component B carries some occluded component A. This heater 15 is, of course, operated at such a temperature as will melt component B and some B will flow toward the cooler 44. There is accordingly, a refluxing at this point and a progressive increase in the concentration of component B on passing from right to left in the adiabatic section 58. Pure liquid component B is removed from the system through the pipe 14 for such disposal as desired.

The solid adsorbent material with its adsorbed component B and some occluded component A which is removed from the tube 11 through conduit 31, as mentioned hereinabove, is passed to an adsorbent regeneration system. This adsorbent regeneration system may be any system desired, provided it serves to remove the occluded and adsorbed components from the adsorbent in a satisfactory manner. The regeneration operation may include a heating step and stripping with steam or an inert gas, as desired, provided, of course, none of the stripping agents are detrimental to the adsorption efficiency of the adsorbent. The adsorbent freed of its charge of components is passed from the regeneration apparatus 67 through the conveyor 71 and conveyor 72 and is recycled to the adsorption zone. Makeup adsorbent material may be introduced into the system through the conduit or conveyor 73 from a source not shown and as needed.

When solid component B is frozen from the liquid in cooler 44, the component B is transferred by the conveyor in the direction of the heater 15. The liquid remaining in the cooler 44 is substantially of a eutectic composition provided the cooler has chilled its contents to a temperature at, or very near, the eutectic temperature. This cooler should not cool the liquid to a temperature below the eutectic temperature since under such a condition solid eutectic would form in the cooler and the formation of solid eutectic is to be avoided. The residual eutectic liquid from the cooler 44 works its way from the region of this cooler into the end of the heater 41 in which it is mixed with the liquid of eutectic composition originating in the cooler 47, and it is this mixture of eutectic liquids originating from both of the coolers which is contacted by the solid adsorbent in the region of the heater 41. The screen 56 or other means is provided within the tube 11 to prevent solid adsorbent material from passing into and through line 50 and line 52, along with liquid into the B component recovery end of the tube 11.

The recovered components A and B from the adsorbent regeneration apparatus 67 are passed through the conduit 68 and through valve 66 to be combined with the feed stock introduced through line 62 in case this desorbate material has a composition near that of the original feed stock. In case the composition of the desorbate flowing through line 68 is nearer the composition of liquid being transferred through pipes 50 and 52 by pump 51 into the B recovery end of the unit, this desorbate material will then be passed through valve 69 and line 70 into the B recovery end of the crystallizer. Valve 66 will, of course, be closed. When desorbate is added to the feed in line 62, valve 66 is open and valve 69 will be closed.

In case the original feed stock composed of components A and B contains component B as the saturating component, valve 60 will be closed and the feed stream will be passed through valve 65 and lines 63 and 64 into the B recovery end of the crystallizer. When B is the saturating component and the feed is introduced through line 64, the operation of the remainder of the system is exactly like that described hereinbefore for the system when component A is the saturating component and the feed stock is introduced through line 62.

Under the conditions that component A is the saturating component of the feed stock and the feed is introduced through line 62 and the adsorbent material is of such a type that component B is adsorbed from the eutectic liquid in the region of heater 41, the liquid remaining in heater 41 again contains component A as the saturating component and this liquid is then transferred through a pipe 50 and pipe 54 under the influence of pump 51 into the component A recovery end of the crystallizer. Under these latter conditions, the solid adsorbent material will need to be passed through the system in relatively large quantities and large amounts of component B will be adsorbed and carried into the adsorbent regeneration sytsem 67. Desorbate from the regenerator 67 will then be rich in component B and this desorbate will then pass through line 68, valve 69, and lines 70 and 64 into the B recovery end of the crystallizer. Component B will be frozen out in cooler 44 and solid B transferred toward heater 15 with refluxing as described above. Pure component B will be removed through line 14. Liquid eutectic remaining as a residue in cooler 44 will then work its way by passing through opening 82 in partition plate 81 into the region of the heater 41 in which it will combine with the eutectic liquid from cooler 47 to be contacted by the adsorbent.

Under the condition when component B is the saturating component and component B is the component adsorbed by the adsorbent, the feed stock will be introduced into the system through the line 64. Component B will be crystallized in cooler 44 and solid B will then be moved to the heater 15 as described above. The eutectic liquid remaining in cooler 44 works its way through the opening 82 in plate 81 into the region of the heater 41 to be contacted with the absorbent. The adsorbent removes by adsorption some of component B so that the liquid remaining in the region of the heater 41 contains component A as a saturating component. This remaining liquid A is removed from this region through pipes 50 and 54 and is added to the A recovery end of the crystallizer. The liquid entering the tube 11 from pipe 54 works its way into the cooler 47 in which some solid component A crystallizes, and this component is then moved in the direction of the heater 33. Component A as a liquid is removed through pipe 32, while the solid adsorbent with its adsorbed component B and some occluded component A is transferred by conveyor 31 to the regeneration unit 67. Under these conditions desorbate from the regeneration apparatus is rich in component B, and it is passed through line 68, valve 69, and lines 70 and 64 into the B end of the crystallizer.

Under the conditions when the feed stock is composed of a mixture of components A and B of eutectic composition, the charge may be introduced from the feed line 63 through line 59, line 83, valve 84, and pipe 72 along with the adsorbent into the crystallizer tube. This liquid feed stock may, of course, be passed into the crystallizer apparatus through a separate tube 76 at about the adsorbent feed point, if desired. The feed stock eutectic mixture is added to the system at a point near the adsorbent addition point so that the adsorbent will have an opportunity to adsorb one of the components preferentially to the other to break the eutectic so that the cooler 44 or the cooler 47 may be able to crystallize the excess of component B or component A from the liquid remaining after adsorption. In this latter case, if component A is adsorbed from the eutectic feed stock, the liquid remaining from the adsorption contains component B as a saturating component and this residual liquid is transferred through pipes 50 and 52 into the B end of the crystallizer. In case component B is the component adsorbed by the adsorbent from the eutectic mixture feedstock, the liquid remaining from the adsorption contains component A as the saturating component and this residual liquid is then transferred through pipes 50 and 54 into the A component end of the crystallizer. The operation in other respects is exactly the same as hereinbefore described.

The adiabatic sections of my crystallizer apparatus 57 and 58 are intended to be well-insulated so that the refluxing action within these sections will be as nearly complete as possible.

*Specific example*

As an example of the utility of my apparatus for separating a two-component eutectic forming system into its components, I will describe the separation of benzene from normal heptane. Benzene possesses a melting point of 41.7° F., normal heptane melts at −130.5° F., while a mixture of these components in eutectic composition proportions melts at −134.5° F. The eutectic composition is 93 per cent by weight benzene and 7 per cent by weight normal heptane.

Silica gel is the adsorbent used to adsorb selectively one of the components. This adsorbent, in general, adsorbs aromatic hydrocarbons in preference to other hydrocarbons. In a mixture of benzene and normal heptane, silica gel presents an adsorption isotherm of the type illustrated in Figure 3 of the drawing. However, on reference to Figure 3, if component A represents benzene and component B represents normal heptane, the curve crosses the horizontal line at a benzene concentration of 99 per cent (normal heptane 1 per cent). Thus, the composition of a benzene-normal heptane system at which silica gel becomes selective for the adsorption of normal heptane is 99 per cent benzene and 1 per cent normal heptane.

Based upon each 100 pounds of feed stock containing 25 pounds normal heptane and 75 pounds benzene, the separation into benzene and heptane is made under the following conditions:

The feed stock is continuously introduced into the crystallizer tube through feed line 62. The liquid feed flows from right to left in the crystallizer tube 11 and is chilled to a temperature of about −134° F. (just above the eutectic temperature, −134.5° F.) at which temperature benzene crystallizes since it is the saturating component. The crystalline benzene is then moved by the screw 36 toward the heater 33. The liquid not frozen in chiller 47 and which flows by displacement from right to left from chiller 47 toward heater 41 contains 12 per cent benzene and 88 per cent normal heptane. Silica gel adsorbent, 35 pounds, enters the heater section 41 by way of adsorbent feed line 72. This adsorbent adsorbs most of the benzene, leaving a liquid of 2.5 per cent benzene and 97.5 per cent normal heptane in the heater section 41. This heater section is operated at a temperature of about 130° to 131° F. or at such slightly lower temperature that normal heptane will not freeze out. Liquid of this composition, 2.5 per cent benzene—97.5 per cent normal heptane, is removed from heater section 41 through pipe 50 and pumped through pipe 52 into the adiabatic section 58 at a point near the cooler 44. This liquid and the liquid already present at this point mix and the mixture contains 96 per cent normal heptane and 4 per cent benzene. Chiller 44 is operated at such a temperature that this mixture is chilled to very nearly the eutectic temperature (−134.5° F.), at which temperature normal heptance crystallizes. The heptane crystals are moved by the screw 18 toward the heater 15. The heater 15 is operated at a temperature of about −130° F. so that heptane crystals will just melt. Per 100 pounds of feed of the above-mentioned composition 25 pounds of a normal heptane product containing 24.925 pounds of normal heptane and 0.075 pound benzene are withdrawn through line 14. Some of the heptane melted by heater 15 flows toward the cooler to reflux the crystalline heptane.

The silica gel which is fed to the crystallizer through conduit 72 moves in the direction of the heater 33. As this gel with its charge of adsorbed benzene and the benzene crystals move through the adiabatic section 57, they are refluxed by liquid benzene flowing from right to left. This refluxing operation increases the benzene content of the solids approaching the heater 33 until a point is reached near this heater when the concentration of benzene exceeds 99 per cent. At a concentration of 99 per cent benzene, the silica gel reverses itself and becomes an effective adsorbent for the normal heptane. The gel leaves the unit through conduit 31 with its charge of adsorbed heptane and occluded benzene.

The silica gel is regenerated by heating, with or without use of a stripping agent as needed. The adsorbate, free from moisture if steam is used for stripping, contains 9.64 per cent normal heptance and 90.36 per cent benzene and is returned with raw feed to the crystallizer. The adsorbent is recycled to the process.

The benzene crystals formed in the chiller 47 are moved with the adsorbent through the adiabatic section 57 to the heater 33 in which they are melted. A portion of the melted benzene and desorbed benzene flows from right to left as a refluxing agent while the remainder, 75 pounds containing 74.925 pounds benzene and 0.075 pound normal heptane, is removed through line 32 as product. This product has a composition of benzene 99.9 per cent and normal heptane 0.10 per cent by weight.

If a normal heptane product of intermediate purity were desired, the liquid of 97.5 per cent normal heptane and 2.5 per cent benzene content withdrawn from heater 41 through line 50 and cycled to the adiabatic section 58 could be withdrawn as such a product.

For low temperature crystallization operations, the coolers 44 and 47 may be cooled by any desired and suitable means, as for example, propane, ethylene, or other hydrocarbon or non-hydrocarbon refrigerant. In like manner, the heaters 15, 33, and 41 may be heated by any desired and suitable means. In the above given example, these heaters are called heaters since they are intended to maintain their immediate crystallizer sections at higher temperatures than the coolers or chillers. These higher temperatures may yet be far below atmospheric temperature, as in the benzene-normal heptane example given above. Such "heaters" may be operated by refrigerants as mentioned. For other separations, the coolers may need to be operated at atmospheric or even above atmospheric temperatures, while the heaters may need to be operated at higher than atmospheric temperatures. Under such conditions, water as a heating or cooling agent, or steam or other heating or cooling media may be used.

The conduits 31 and 71—72 may be such type of conveyors as are adapted for the transfer of solid material from one process point to another. For example, screw conveyors, bucket or belt conveyors or any other suitable type may be used.

For purposes of simplicity, many valves, pressure, and temperature recording and controlling apparatus and other auxiliary apparatus has not been shown. The installation and operation of such auxiliary apparatus is understood by those skilled in the art.

The above description of my apparatus and of the use of this apparatus in separating a simple two-component system into its constitutent parts is given merely as illustrative of my apparatus and its use and my invention is not intended to be limited thereby, but only by the following claims.

Having described my invention, I claim:

1. A process for separating one hydrocarbon from a liquid mixture of said one hydrocarbon with another hydrocarbon, said one hydrocarbon being preferentially adsorbable from said mixture, said hydrocarbons being miscible in the liquid state and forming an eutectic mixture in the solid state, said mixture of hydrocarbons containing said one hydrocarbon in a concentration greater than its concentration in said eutectic mixture comprising, in combination, the steps of cooling said mixture to a temperature at which said one hydrocarbon crystallizes, but above that temperature at which said eutectic mixture crystallizes, contacting the resulting mixture of liquid and crystals with a solid adsorbent, said one hydrocarbon being preferentially adsorbed by said adsorbent and said adsorbent having an S-type adsorption curve, separating unadsorbed liquid from the adsorbent and crystals, heating the solid adsorbent with its charge of adsorbed one hydrocarbon and crystals of said one hydrocarbon to a temperature sufficiently high to melt the crystals and form a zone of nearly pure liquid one hydrocarbon passing a portion of the melted one hydrocarbon countercurrently and in contact with said solid adsorbent and crystals to reflux same, removing the other portion of the melted one hydrocarbon as one product of the process, removing solid adsorbent containing adsorbed other hydrocarbon, desorbing said other hydrocarbon from the adsorbent and adding the desorbed material to the original feed stock, returning the desorbed adsorbent to the original contacting operation as the first mentioned solid adsorbent, chilling the separated unadsorbed liquid to a temperature at which said other hydrocarbon crystallizes, but above that temperature at which said eutectic mixture crystallizes, removing the crystals of said other hydrocarbon from the remaining liquid, passing this latter remaining liquid into the abovementioned solid adsorbent contacting operation, melting said crystals of said other hydrocarbon, refluxing the latter said crystals of said other hydrocarbon prior to said melting with a portion of the melted other hydrocarbon and removing the other portion of said melted other hydrocarbon as a second product of the process.

2. The process of claim 1 wherein said one hydrocarbon is benzene and said other hydrocarbon is normal heptane, and the chilling and cooling operations are carried out at a temperature just above the eutectic temperature and the solid adsorbent is silica gel.

3. A process for separating one hydrocarbon from a liquid mixture of said one hydrocarbon with another hydrocarbon, said one hydrocarbon being preferentially adsorbable from said mixture, said hydrocarbons being miscible in the liquid state and forming a eutectic mixture in the solid state, said mixture of hydrocarbons containing said one hydrocarbon in a concentration greater than its concentration in said eutectic mixture comprising, in combination, the steps of introducing said mixture into an elongated and horizontally disposed cylindrical treating zone at a point about midway from a partition to one end, said partition being at about the center longitudinally of said zone, chilling said mixture to a temperature at which a portion of said one hydrocarbon crystallizes leaving a liquid of substantially eutectic composition, introducing a solid adsorbent having an S-type adsorption curve into said treating zone intermediate said partition and the point of introduction of said mixture, said one hydrocarbon being selectively adsorbed by said adsorbent from said liquid of eutectic composition, gradually transferring said adsorbent from its point of introduction and said crystals of said one hydrocarbon toward said one end of said zone, heating the mixture of crystals and adsorbent while in transit to a temperature above the melting temperature of said crystals and to form a zone of nearly pure one hydrocarbon adjacent said one end of said treating zone, passing a portion of the melted one hydrocarbon countercurrently with respect to the direction of travel of the mixture of the adsorbent and crystals to reflux same, removing the remaining melted one hydrocarbon as one product of the process, removing solid adsorbent containing adsorbed other hydrocarbon from said one end of said cylindrical zone, desorbing the hydrocarbon from the removed adsorbent and returning the adsorbent to the treating zone as the first mentioned solid adsorbent, removing liquid rich in said other hydrocarbon from said treating zone at a point intermediate said partition and said one end and near said partition, introducing this withdrawn liquid into said treating zone at a point intermediate said partition and the other end thereof, chilling this latter introduced mixture to a temperature at which a portion of said other hydrocarbon crystallizes leaving the liquid of substantially eutectic composition, gradually transferring the crystals of said other hydrocarbon toward said other end of said treating zone, melting the transferred crystals in the vicinity of said other end of said treating zone to form a zone of nearly pure liquid other hydrocarbon, passing a portion of the melted other hydrocarbon countercurrently with respect to the direction of travel of said crystals of said other hydrocarbon to reflux same, removing the remaining portion of the melted other hydrocarbon as the second product of the process and passing liquid from a region intermediate the partition of said treating zone and said other end thereof but adjacent said partition to the other side of said partition.

4. The process of claim 3 wherein said one hydrocarbon is benzene and said other hydrocarbon is normal heptane, and the chilling and cooling operations are carried out at a temperature just above the eutectic temperature and the solid adsorbent is silica gel.

References Cited in the file of this patent

UNITED STATES PATENTS

| Number | Name | Date |
|---|---|---|
| 1,560,473 | Howard | Nov. 3, 1925 |
| 2,204,180 | Gerlach | June 11, 1940 |
| 2,398,101 | Lipkin | Apr. 9, 1946 |
| 2,435,792 | McArdle et al. | Feb. 10, 1948 |
| 2,470,116 | Swietoslawski et al. | May 17, 1949 |
| 2,540,977 | Arnold | Feb. 6, 1951 |